United States Patent [19]
Brody

[11] 3,801,056
[45] Apr. 2, 1974

[54] TISSUE PACKAGE HOLDER AND DISPENSER
[75] Inventor: Samuel Brody, Lincolnwood, Ill.
[73] Assignee: Joseph P. Dumit, Chicago, Ill. ; a part interest
[22] Filed: Apr. 24, 1972
[21] Appl. No.: 246,693

[52] U.S. Cl.............. 248/205, 248/292, 248/311, 248/DIG. 5
[51] Int. Cl............................................ F16m 13/02
[58] Field of Search ........... 248/291, 292, 293, 311, 248/DIG. 5

[56] References Cited
UNITED STATES PATENTS
| | | | |
|---|---|---|---|
| 3,292,889 | 12/1966 | Roll | 248/311 |
| 3,258,238 | 6/1966 | Grafton | 248/311 |
| 1,890,577 | 12/1932 | Flake | 248/293 |
| 1,493,289 | 5/1924 | Speicher | 248/292 |
| 3,284,041 | 11/1566 | Tjaden | 248/311 |
| 2,662,717 | 12/1953 | Johnson | 248/293 |

Primary Examiner—William H. Schultz
Attorney, Agent, or Firm—Alter, Weiss, Whitesel & Laff

[57] ABSTRACT

A tissue package holder and dispenser which maintains the package in abutment with the ceiling of an automobile. The holder comprises a bracket and spring arrangement for holding the back of a tissue box contiguous to the ceiling of the car preferably between the driver and the passenger next to the driver with the open box facing downward to provide easy access to the tissues.

7 Claims, 5 Drawing Figures

PATENTED APR 2 1974   3,801,056
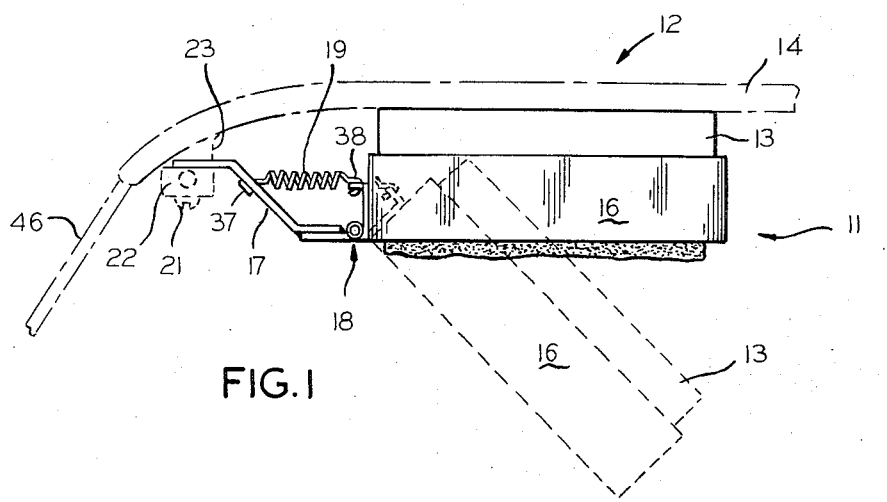
FIG. 1
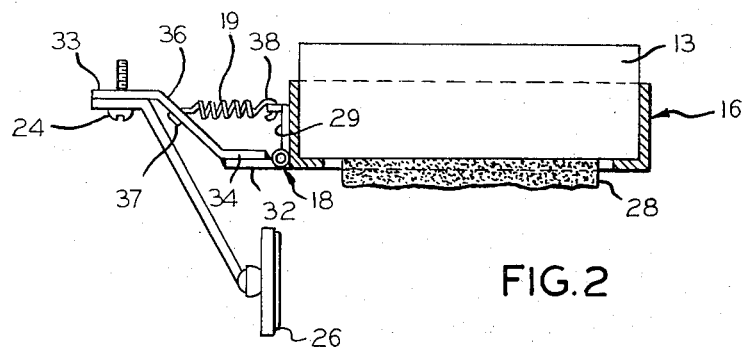
FIG. 2
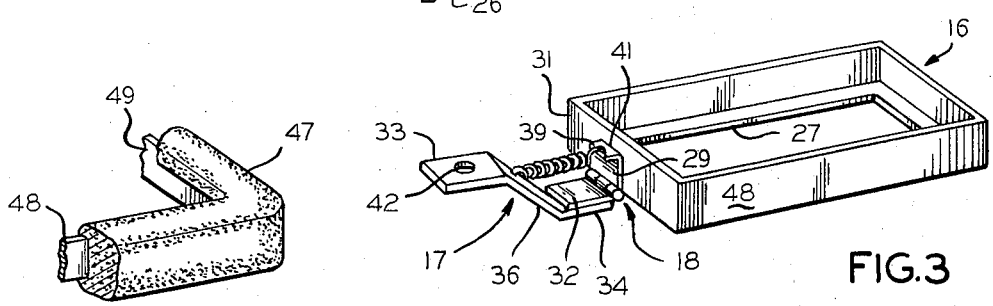
FIG. 3
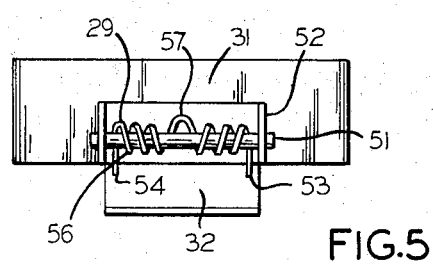
FIG. 4
FIG. 5

3,801,056

TISSUE PACKAGE HOLDER AND DISPENSER

The present invention is concerned with tissue paper dispensers and more particularly with a holder for retaining a box of tissues adjacent to the ceiling of an automobile to assure the availability of the tissues in the box, and at the same time to keep the box in a safe place so that it is not crushed or otherwise mutilated.

A box of tissues is always useful in an automobile. For example in an automobile that is used for family transportation, where the children are taken to and from school, there is a constant need for tissues. If the box of tissues is kept on the seat, it is often sat upon and crushed so that it is difficult to pull the tissues from the box. Or else the box is so mutilated that the tissues escape therefrom and mess up the car.

To overcome the mutilated box problem, clamps have been provided for retaining the box of tissues at the back of the sun visor. This solution has proved to be inadequate since the weight of the box of tissues usually causes the sun visor to be lowered when the driver or passenger does not want the sun visor in the lowered position.

Accordingly, it has long been desirable to find a safe place to keep a box of tissues safe from mutilation and still keep the tissues readily available. For example, the glove compartment is considered a safe place for the tissues but in that case it is not readily available to the driver because the driver must reach over to the opposite side of the front of the car and open the glove compartment to obtain a tissue.

It is accordingly an object of this invention to provide a safe yet available place to retain a box of tissues.

A related object of this invention is to provide a holder and dispenser arrangement having a bracket and box retainer arrangement that will hold a box of tissues with the tissues readily available and wherein the box can be readily replaced with a new box of tissues when all the tissues in the old box have been used.

Another object of the invention is to provide means for attaching a box of tissues to the ceiling of an automobile in the front part of the car so that it is readily available to the driver while he is driving but yet will not adversely affect the safety of passengers in the car.

Still another object of this invention is to provide a spring bracket and box retainer for retaining the box of tissues abutting the roof of the car with the open front of the box readily available to the driver and passengers.

In accordance with a preferred embodiment of the present invention the tissue box holder is provided with means for attaching it to the roof of the car using the fastener that is presently used to hold the sun visor bracket in place. The tissue box holder comprises a bracket portion and the box retainer portion. The bracket portion has a flat aperture section through which the fastener presently used to retain the sun visor bracket can pass. A hinge is provided that is resilient either through the use of external springs or hinge spring arrangements to cause the box in its normal position to be held against the ceiling of the car. It is possible to pull the box retaining portion of the holder arrangement away from the ceiling to replace the tissue box therein by merely slipping the empty tissue box out and replacing a new tissue box in with its open end facing downwards.

The inventive embodiment also includes a cushion bracket for extra safety.

The above mentioned objects and features of the invention will now be explained in detail with the aid of the accompanying drawings; wherein:

FIG. 1 shows a partial sectional view of the automobile showing the roof and ceiling thereof with the tissue package holder and dispenser normally retaining the tissue box abutting the ceiling of the car. A dashed line indicates the holder in the pulled down position;

FIG. 2 shows the tissue box holder and dispenser arrangement positioned by the rear view mirror fastener screw;

FIG. 3 is a pictorial view of the tissue box holder and dispenser arrangement without a tissue box therein;

FIG. 4 shows a break-away view of a portion of the tissue box holder cushioned for safety purposes; and FIG. 5 shows a spring hinge arrangement used in another embodiment of the tissue package and holder arrangement.

Turning now to the drawings, therein is shown at 11, the tissue box holder and dispenser arrangement mounted in an automobile indicated generally as 12. The tissue box holder arrangement, it should be noted, holds a tissue box 13 contiguous to the ceiling 14 of the automobile.

The tissue box holder arrangement 11 comprises a box retainer 16, hingedly coupled to a bracket 17 through a hinge arrangement 18. The hinge and bracket arrangement enables the box retainer 16 to be pulled downward as shown in dashed line form for replacing the empty tissue box.

Resilient means, such as spring 19, are provided for maintaining the box retainer 16 in a normal horizontal position with the top (rear) of the tissue box contiguous to the ceiling of the automobile. The spring acts in cooperation with the hinge arrangement 18 between the box retainer 16 and the bracket 17.

The bracket is held with a fastener that is normally found in every car; that is, the fastener 21, used for holding the sun visor bracket 22 in place. The top of the visor bracket 23 acts as a retainer or washer. Other fasteners in the automobile, such as the fastener 24 used for holding the rear view mirror 26 in position may be utilized for properly attaching the tissue holder and dispenser arrangement in the automobile. The tissue box holder is positioned for use while the automobile is driven because the tissues are readily available to a potential user, even to the driver of the automobile.

As best seen in FIG. 3 the means for actually holding the tissue package is box retainer 16 and it preferably comprises a sheet metal structure shaped so that the box of tissues can be readily slid into the box retainer. Means, such as lip 17, is provided to assure that the tissue box does not fall or is not pushed through the box retainer. Instead, the box of tissues is held in such position that the open box with the tissues, such as tissue 28, is readily available to a user while the tissue box is not in any danger of being crushed by passengers in the automobile.

The hinge arrangement 18 comprises a first hinge plate 29 that is fastened to one side 31 of the box retainer 16. The mode of fastening is not important. It may either be fastened using rivets, threaded fasteners or it may be brazed or welded into place. The other hinge plate 32 of hinge arrangement 18 is similarly fastened to the bracket 17.

The bracket 17 comprises a top horizontal portion 33 and a bottom horizontal portion 34. The bottom horizontal portion 34 is fastened to hinge plate 32. The top and bottom horizontal portions of the bracket are joined together by a biased portion 36 of the bracket.

Means are provided for joining the spring between the bracket 17 and the box retainer 16. More particularly an aperture is provided in the bias portion of the bracket through which the spring extends and is curled at 37 as best seen in FIGS. 1 and 2, to prevent the spring from releasing. The other end 38 of the spring 19 fits through an aperture 39 in a flange 41 that is either integral to hinge plate 29 or fastens thereto.

Means such as aperture 42 in the horizontal portion 33 of the bracket 17 is provided to receive the fastener, such as fasteners 21 or 24, passing therethrough. The tissue box holder is thus ideally positioned adjacent the ceiling of the automobile between the driver and the passenger in the front seat. The tissue box holder and dispenser extends rearwardly so that the tissues are readily available to the driver or front seat or rear seat passengers.

In actual use the fastener 21 is removed and slipped through the aperture 42 and the bracket 22 to hold the bracket in place extending rearwardly between the driver and the front seat passenger. The tissue box retainer is held by the spring 19 against the ceiling 14 of the car. The box of tissues is placed in the box retainer and is held against the ceiling. The holder and dispenser arrangement in no way hinders the view through the windshield 46. It should be noted that the holder arrangement is also not normally in the path of bodies being jostled about in any accident. However, notwithstanding this, it is within the scope of the invention to provide means for assuring that the holder arrangement cannot harm anybody in case of accident. This is accomplished for example by providing the box retainer and bracket with cushioning 47, such as shown surrounding the box retainer side 48 in FIG. 4.

When a new box of tissue is opened and placed with its opening towards the flanges 27 on the box retainer and so that the bottom of the box 13 is held in abutting relation to the ceiling 14 in normal usage, tissues are readily available.

Instead of the spring 19, another embodiment utilizes a hinge spring. This is shown in FIG. 5. Therein the hinge plate 29 is fastened to side 31 of box retainer 16 and a hinge pin 51 is shown passing through ear brackets such as bracket 52 which is part of plate 29. The other hinge plate 32 holds the ends 53, 54 of the hinge spring 56. The middle portion 57 of hinge spring 56 is shaped to abut plate 29 and thereby maintain the box retainer at its normal horizontal position with the box abutting the roof of the automobile.

While the principles of the invention have been described above in connection with specific embodiments, it is to be understood that this description is made only by way of example and not as a limitation on the scope of the invention. Therefore, the appended claims are to be construed to cover all equivalent structures.

I claim:

1. A tissue box holder arrangement comprising a box retainer for holding a box of tissues,
    said box retainer having a lower apertured face,
    means for attaching the box retainer to the interior of an automobile,
    said means for attaching the box retainer to the interior of an automobile comprising first bracket means,
    said first bracket means including an upper horizontal section,
    an aperture in said horizontal section through which a fastener already in the automobile can pass for attaching said holder arrangement to the car,
    second bracket means connected to said box retainer and to said first bracket means,
    means for retaining the box retainer in a position where the back of the tissue box held by the box retainer normally abuts the ceiling of the automobile and is movable away from the ceiling for replacing said tissue box, and
    spring means attached to maintain the lower apertured face of said box retainer in a plane parallel to the ceiling of the automobile.

2. The tissue box holder arrangement of claim 1 wherein said second bracket means comprises hinge means.

3. The tissue box holder arrangement of claim 2 wherein said spring means is internal to said hinge means.

4. The tissue box holder arrangement of claim 1 wherein said resilient means comprises spring means external to said hinge means.

5. The tissue box holder arrangement of claim 4 wherein means are provided for coupling one end of said external spring means to said bracket means and the other end of said external spring means to said box retainer means.

6. A tissue box holder arrangement comprising a box retainer for holding a box of tissues,
    bracket means for attaching to the box retainer to the interior of an automobile,
    said bracket means including means for receiving a fastener already in the automobile for positioning the box retainer,
    means for maintaining the box retainer in position where the tissue box held by the box retainer abuts the ceiling of the automobile and is movable away from the ceiling for replacing the tissue box,
    said means for maintaining the box retainer in position comprising hinge means,
    said hinge means connecting said bracket means and said box retainer to enable moving the box retainer away from the ceiling,
    resilient means operating in cooperation with said hinge means to normally retain the box retainer in a position wherein the back of the tissue box abuts the ceiling,
    said resilient means comprising spring means external to said hinge means,
    means for coupling one end of said external spring means to said bracket means and the other end of said external spring means to said box retainer means,
    said bracket means comprising:
    an upper horizontal section and a lower horizontal section, a bias section joining said upper and lower horizontal sections;

said hinge means comprising a first hinge plate and a second hinge plate;

hinge pin means for hingedly coupling said first and second hinge plates, means for connecting said first hinge plate to the lower horizontal section, and means for coupling the second hinge plate to said box retainer whereby said box retainer is hingedly coupled to said bracket means.

7. The tissue box holder arrangement of claim 6, a bracket aperture in the bias portion of said bracket means for receiving one end of said spring means, flange means on the second hinge plate, a flange aperture on said flange means for receiving the other end of said spring; and wherein said retainer box comprises sheet metal sides having a rectangular shape and dimensioned so that the tissue box slip fits within the confines of said sheet metal sides, and lip means along the bottom of said sheet metal sides to assure that the tissue box does not slide through said sides.

* * * * *